United States Patent [19]

Mosier

[11] Patent Number: 4,812,083
[45] Date of Patent: Mar. 14, 1989

[54] QUICK-DISCONNECT APPARATUS FOR INFLATING A SCUBA DIVING BUOYANCY JACKET

[75] Inventor: Arthur R. Mosier, Los Almitos, Calif.

[73] Assignee: Undersea Industries, Inc., Rancho Dominguez, Calif.

[21] Appl. No.: 55,998

[22] Filed: Jun. 1, 1987

[51] Int. Cl.$^4$ ............................................. B63C 11/08
[52] U.S. Cl. ..................................... 405/186; 405/185
[58] Field of Search ....................... 405/185, 186, 187; 285/321; 444/88, 92

[56] References Cited

U.S. PATENT DOCUMENTS

| | | | |
|---|---|---|---|
| 3,439,943 | 4/1969 | Thorne | 285/321 X |
| 3,603,619 | 9/1971 | Bengesser et al. | 285/321 X |
| 4,126,335 | 11/1978 | Voss | 285/321 X |
| 4,437,790 | 3/1984 | Trop | 405/186 |
| 4,502,817 | 3/1985 | Long et al. | 405/186 |

Primary Examiner—David H. Corbin
Attorney, Agent, or Firm—Leonard Tachner

[57] ABSTRACT

A quick-disconnect apparatus for quickly and conveniently disconnecting and reconnecting an inflator hose and a diver's buoyancy jacket. The invention is disclosed in the form of an elbow configuration for use on the buoyancy jacket in the place of conventional "screw" type connection devices used throughout the diving industry. The quick-disconnect of the present invention comprises a plastic right angle elbow which couples the inflation hose to the buoyancy jacket. This coupling is accomplished by a novel lock ring member and a complementary pin ring. The lock ring member provides a plurality of slotted pin guides and an expandable gap which permits the lock ring to selectively engage a nut ring secured to the buoyancy jacket. Rotation of the lock ring in one direction closes the gap and reduces the inner diameter of the lock ring to engage the nut ring. Rotation of the lock ring in the other direction opens the gap and expands the inner diameter of the lock ring, disengaging the lock ring from the nut ring and permitting the user to easily and simply remove the elbow-shaped disconnect from the buoyancy jacket.

17 Claims, 5 Drawing Sheets

QUICK-DISCONNECT APPARATUS FOR INFLATING A SCUBA DIVING BUOYANCY JACKET

BACKGROUND OF THE INVENTION

1. Field of the Invention

The present invention relates generally to scuba diving equipment and more specifically, to a quick-disconnect and receptacle such as for attachment to a buoyancy jacket providing means for easy and expedient connection and disconnection of the inflator tube to the buoyancy jacket.

2. Prior Art

The use of buoyancy jackets by scuba divers is well-known. The use of a buoyancy jacket particularly in conjunction with complementary weight systems permits a scuba diver to regulate his buoyancy for his particular body weight, displacement, the weight of his equipment and his particular diving requirements. A typical buoyancy jacket is a vest-shaped, flexible piece of equipment usually provided with one or more straps to which the air tank may be secured. A significant portion of the vest fabric structure is provided with an inflatable compartment that may withstand a significant amount of air pressure in order to increase the buoyancy of the diver in proportion to the volume of the inflated jacket. In the last few years it has become popular to utilize power inflators and inflator/auxiliary regulator devices to permit the tank air pressure to be used to inflate the buoyancy jacket. Such regulator devices are typically fastened to an inflator hose on the jacket. Such hoses are normally left on the jacket between dives because of the arduous task and inconvenience of unscrewing the conventional elbow connection between the inflator hose and the jacket. As a result, an expensive and sensitive piece of diving equipment is exposed to the hazards of handling and the high likelihood of damage that may result therefrom. Thus for example, with the inflator and/or auxiliary regulator still attached to the buoyancy jacket, the tank and jacket assembly may and frequently do fall over, particularly aboard a boat. A heavy tank landing on the inflator could cause substantial damage if not complete destruction of the device which would, of course, require replacement of an expensive piece of diving apparatus or more importantly, could cause unseen internal damage to the device which could lead to a serious accident.

There is therefore a current need for a connection means which provides a way of removing the inflator hose from the jacket but more importantly, there is a concurrent need for such a device wherein the removal is easy and convenient thereby promoting its use.

The following United States patents are believed to constitute the prior art most relevant to the general quick-disconnect feature of the present invention:

| | |
|---|---|
| 2,448,688 | Scheiwer |
| 3,107,373 | Mellon, Jr., et al |
| 3,147,499 | Nelson et al |
| 3,436,777 | Greenwood |
| 3,486,730 | Potash |
| 3,699,589 | Durney |
| 3,727,250 | Koehn et al |
| 3,747,140 | Roberts |
| 3,877,098 | Braly |
| 4,045,835 | Flam et al |
| 4,111,197 | Warncke et al |
| 4,378,795 | Feathers et al |
| 4,506,665 | Andrews et al |

U.S. Pat. No. 4,506,665 to Andrews et al is directed to an anesthetic supply valve and adaptor for masks. This patent discloses a mask which has an orifice structure through which gas is passed for inhalation by the user. An orifice of the mask connects to an elbow fitting which is coupled to an additional fitting. A valve member provides an adaptor member which has a tapered male connector end which is coupled to and is easily detachable from the valve member of a coupler unit.

U.S. Pat. No. 3,107,373 to Mellon, Jr., et al is directed to an inlet control for an escape system. A flow control element formed of a hexagonally-shaped body has a tubular arm extending therefrom. The control element is attached to a casing by threading it over a stem with threads engaged with the externally threaded stem and with a washer engaged against a shoulder of the inner end of the threads.

U.S. Pat. No. 3,727,250 to Koehn et al is directed to a vest inflation/exhaust valve assembly including a valve assembly which is generally in the form of an elbow element. Apparently, the driver can hold the assembly in one hand and is able to control both inflation/venting by actuation of one or two fingers.

U.S. Pat. No. 3,747,140 to Roberts is directed to an inflatable vest having a quick-release hose connection to the supply tank. A quick-disconnect and valve assembly permits the vest to be inflated with air from the scuba supply tank. The vest is inflated from the tank and is provided with the coupling which is the vest attached component of a assembly. A quick release or disconnect connector is attached to the coupling and depression of the valve handle allows air to flow from the tank through the hose and the assembly into the interior of the vest. Once the vest has been inflated, the connector is released from the coupling and a check valve stops escape of air from the vest. This reference appears to be the most relevant of those known to the applicant.

The following additional United States patents are deemed to be the most relevant prior art in regard to the novel lock ring assembly of the present invention:

| | |
|---|---|
| 2,505,320 | Bernhard |
| 3,377,093 | Macoicz |
| 3,584,313 | Brown et al |
| 4,034,416 | Buffkin et al |
| 4,091,465 | Webbon et al |
| 4,095,829 | Van Klompenburg |
| 4,235,465 | Costello |
| 4,328,798 | Isaacson |
| 4,437,790 | Trop |
| 4,633,890 | Carden |

U.S. Pat. No. 4,328,798 to Isaacson is directed to a breathing apparatus with a connector system for supplying emergency air. It provides a bayonet-type system where a bayonet-type slot allows insertion of a lug therein of the unit or tubular adaptor. This provides for locking, however, obviously does not direct itself to a cam-type operation.

U.S. Pat. No. 4,095,829 to Van Klompenburg is directed to a window lock. This is remotely relevant because it discloses a camming action latching mechanism. Rotational movement of a member is converted to a linear movement of a link and then back to a rotational movement of the member through pin/slot connections at each end of the link. The member has a slot which co-acts with a pin on the link. This disclosure provides a latching-type of mechanism where there is a pin insertion within a camming-type slot.

U.S. Pat. No. 4,437,790 to Trop is directed to a buoyancy compensator and provides for a locking ring-type of system, but not in a camming concept. In this reference, prongs pass through slots. When an exhaust tube is rotationally displaced, the prongs are beneath and engage an annulus.

U.S. Pat. No. 4,235,465 to Costello is directed to another burglar-proof window latch-type system and includes a keeper and a latch. The latch is rotated under the keeper for engagement purposes.

SUMMARY OF THE INVENTION

The present invention is a quick-disconnect apparatus for use on a buoyancy jacket and gives the user the ability to quickly and easily remove the inflator hose from the jacket. The invention is disclosed in the form of an elbow configuration for use on the buoyancy jacket in the place of conventional "screw on" type connection devices used throughout the diving industry. The quick-disconnect of the present invention comprises a plastic right angle elbow which couples the inflation hose to the buoyancy jacket. This coupling is accomplished by a novel lock ring member and a complementary pin ring. The lock ring member provides a plurality of slotted pin guides and an expandable gap which permits the lock ring to selectively engage a nut ring secured to the buoyancy jacket. Rotation of the lock ring in one direction closes the gap and reduces the inner diameter of the lock ring to engage the nut ring. Rotation of the lock ring in the other direction opens the gap and expands the inner diameter of the lock ring, disengaging the lock ring from the nut ring and permitting the user to easily and simply remove the elbow-shaped disconnect from the buoyancy jacket.

The nut ring cooperates with a nipple for sandwiching the fabric of the buoyancy jacket therebetween, securing the nut ring and nipple thereto. The elbow is provided with a tubular extension having an O-ring groove for supporting an O-ring which bears against the inside surface of the nipple to provide a leak-proof seal between the elbow and interior of the buoyancy jacket. The resultant configuration provides 360 degrees mobility within the plane of the buoyancy jacket surface allowing the quick-disconnect elbow to provide the user with extreme comfort when raising the attached inflator mechanism to his mouth for oral inflation of the vest. Furthermore, by using the annular lock ring configuration, the quick-disconnect elbow of the present invention is provided with 360 degrees of engagement with the mating receptacle which renders the assembly more positively attached as compared to the prior art.

The invention provides a large, unobstructed opening into the interior of the buoyancy jacket which serves to facilitate emptying of water from the vest and easy rinsing of the interior with fresh water to remove corrosive salt. One particular embodiment provides an integral thumb-operated tab which prevents a premature or accidental release of the coupling from the vest. The tab covers the actuating means of the lock ring. When the user wishes to remove the elbow from the vest the protective tab is first rotated away from the elbow. This action simultaneously actuates the lock ring through a small portion of its required travel to expose the actuator means thereof to the user. At this point the user engages the actuation means of the lock ring and continues the motion necessary to complete the unlocking of the lock ring. Upon release of the lock ring by the user, a self-springing action of the lock ring returns the device to its original position. In doing so the lock ring re-engages the protective tab to return it to the closed position. The protective tab is held in a closed state by virtue of a slight spring pressure exerted by the lock ring until actuated again by the user.

The lock ring is secured to the elbow by a pin ring which provides a plurality of vertically extending pins, one such pin for each of the pin guides on the lock ring. Each pin guide slides about each pin of the pin ring during opening and closing of the lock ring. Thus the pin ring provides the dual function of firmly supporting the lock ring in the elbow assembly while dictating the path of the lock ring when it is being opened and closed for either releasing or re-engaging the lock ring with the nut ring which is in turn secured to the buoyancy jacket.

OBJECTS OF THE INVENTION

It is therefore a principal object of the present invention to provide a novel buoyancy jacket disconnect device which substantially reduces or entirely overcomes the aforementioned deficiencies of the prior art.

It is an additional object of the present invention to provide a quick release disconnect device for attaching an inflator hose to a buoyancy jacket, the device being easily and simply released from the buoyancy jacket for the convenience of the user and for the protection of the equipment.

It is still an additional object of the present invention to provide a novel lock ring rotary coupling mechanism having a C-shaped configuration and designed to selectively expand and contract by travel of a plurality of tangentially oriented pin guides along corresponding pins for engaging and disengaging the undercut portion of an annular nut ring.

It is still an additional object of the present invention to provide a quick-disconnect device for selectively connecting an inflator mechanism to a buoyancy jacket while providing 360 degrees of mobility for the inflator mechanism relative to the buoyancy jacket thereby providing extreme comfort to the user during oral inflation of the buoyancy jacket.

It is still an additional object of the present invention to provide a buoyancy jacket connector which provides a large unobstructed opening in the buoyancy jacket to facilitate emptying of water therefrom and easy rinsing of the interior thereof.

BRIEF DESCRIPTION OF THE DRAWINGS

The aforementioned objects and advantages of the present invention as well as additional objects and advantages thereof will be more fully understood hereinafter as a result of a detailed description of the invention when taken in conjunction with the following drawings in which.

DETAILED DESCRIPTION OF A PREFERRED EMBODIMENT

Figure 1:
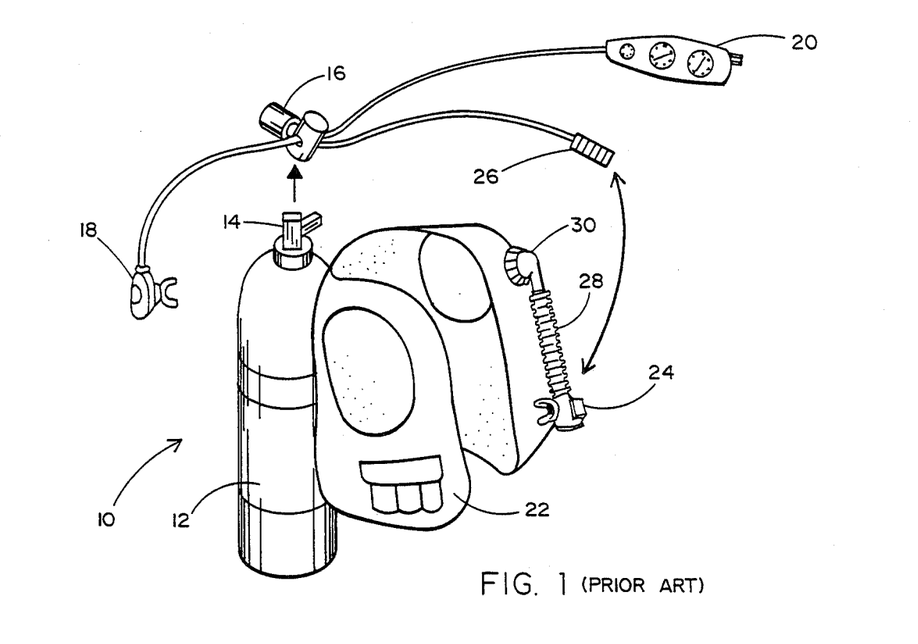
FIG. 1 is a simplified illustration of conventional scuba diving equipment illustrating a prior art means for attaching an inflator hose to a conventional buoyancy jacket.

Referring first to FIG. 1, it will be seen that a prior art scuba gear assembly 10 comprises an air tank 12 having a valve 14 to which is connected a first stage regulator 16. The first stage regulator is designed to provide the first stage of pressure reduction and a means for coupling the reduced air pressure to a primary second stage regulator 18 and a gauge console 20. A buoyancy jacket 22 is provided and may be of a vest-type configuration preferably secured to the air tank 12 to provide a convenient means for securing the air tank to the diver.

A conventional means for inflating the buoyancy jacket 22 is illustrated in FIG. 1. More specifically, as shown therein, the buoyancy jacket is provided with an inflator auxiliary regulator 24 which is adapted to be connected to the first stage regulator 16 through a pressure hose disconnect 26 and connected to the buoyancy jacket through an inflator hose 28 which is in turn coupled to the buoyancy jacket by a conventional elbow connector 30.

As also shown in FIG. 1, when the gauge and air handling devices connected to the first stage regulator are removed from the air tank and buoyancy jacket, auxiliary regulator 24, inflator hose 28 and conventional elbow 30 normally remain attached to the buoyancy jacket because there is no easy and convenient way for a diver to remove the elbow 30 from the buoyancy jacket as a result of the arduous task and inconvenience of unscrewing the current type elbow therefrom.

Figure 2:
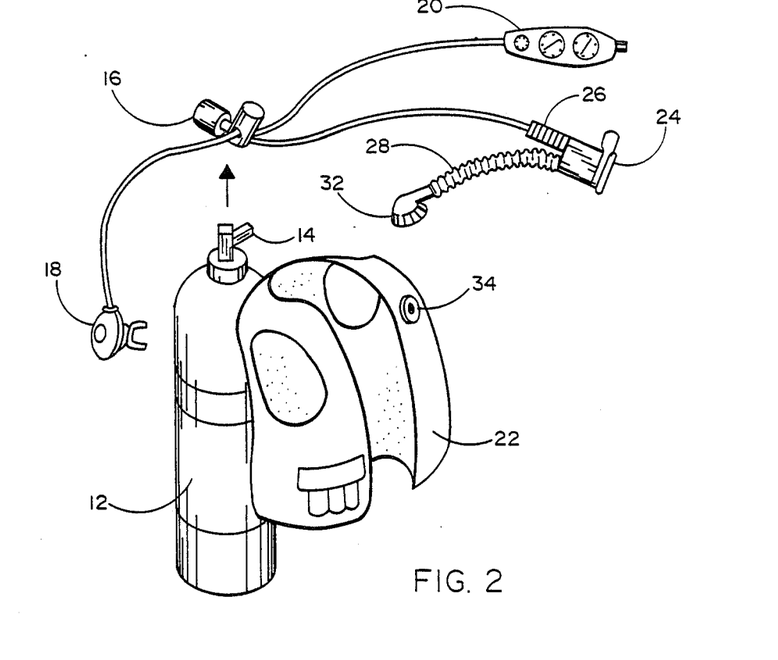
FIG. 2 is a simplified illustration similar to that of FIG. 1 but illustrating the use of the present invention for connecting an inflator hose to a buoyancy jacket.

FIG. 2 illustrates the alternative advantageous features of the present invention as compared to the prior art configuration of FIG. 1. More specifically, it will be seen that in FIG. 2 the conventional elbow 30 of FIG. 1 has been replaced by the quick-disconnect elbow 32 of the present invention which is, in turn, designed to be connected or disconnected from the buoyancy jacket by means of a cooperating receptacle 34. As a result, the auxiliary regulator 24, inflator hose 28 and quick-disconnect elbow 32, may be readily removed from the buoyancy jacket 22 thereby permitting all air handling devices to be removed and stored safely and thus obviating the risk of damage or injury associated with the prior art configuration of FIG. 1.

Figure 3:
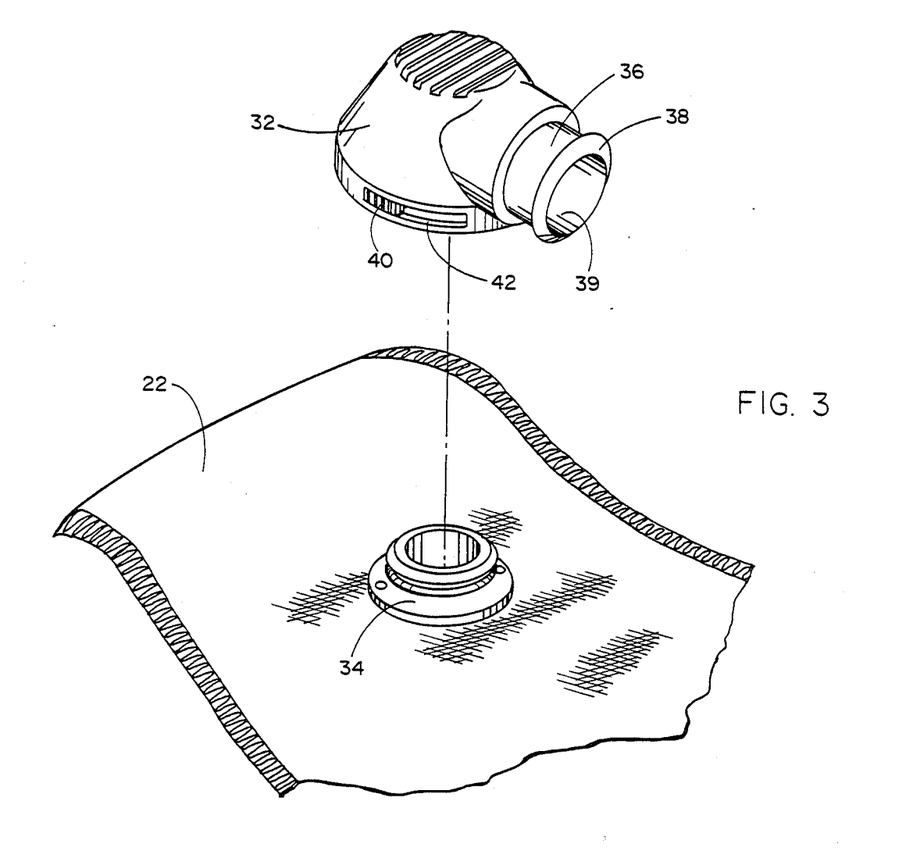
FIG. 3 is a three-dimensional illustration of the manner in which the elbow and lock ring assembly and nut ring and nipple assembly of the present invention interface for selective connection and disconnection of an inflator hose to a buoyancy jacket.
Figure 4:
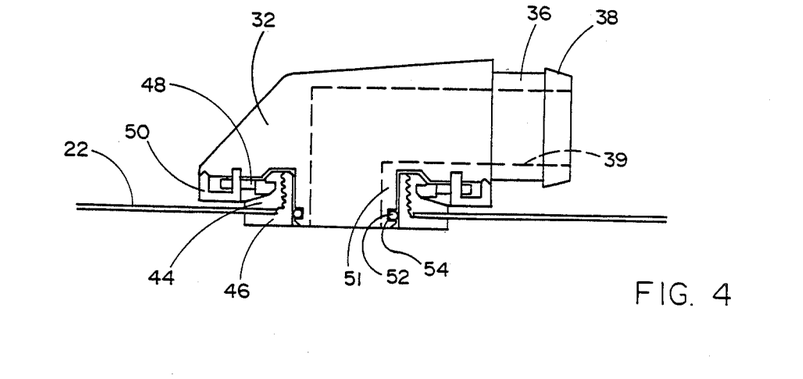
FIG. 4 is a side cross-sectional view of the present invention illustrating the actual interconnection of the elbow portion thereof to the nut ring and nipple portion thereof.

Referring concurrently to FIGS. 3 and 4 it will be seen that the present invention provides a receptacle 34 which comprises a nut ring 44 and a nipple 46. The nipple is an externally threaded tube with a flange at one end to contact the inner surface of the jacket wall leaving the threaded end protruding through the jacket wall toward the outside. Nipple 46 also comprises an internal bore which provides the air passage into the jacket and is sized to provide a slight compression fit with the male protrusion of the elbow 32. The nipple is secured to the jacket wall by means of the nut ring 44 which has an internal thread to match the nipple thread and a flange to provide mechanical clamping when the two parts are engaged and tightened to sandwich the jacket wall between the flanges of each.

The nut ring 44 has an undercut lip which serves the significant function of receiving the lock ring 48 in a manner to be described hereinafter in more detail. The elbow assembly 32 comprises a plastic right angle elbow to couple the inflation hose 28 of FIG. 2 to the buoyancy jacket 22. For this purpose the elbow assembly provides a hose nipple 36 the end of which is provided with a barb 38 and the interior of which is provided with a cylindrical bore 39 which is continuous throughout the elbow assembly 32 and makes a right angle turn continuing through the male tubular extension 51.

Tubular extension 51 is provided with a groove 54 designed to receive an O-ring 52. The O-ring bears against the inner surface of nipple 46 so as to provide a leak-proof seal between the elbow assembly 32 and the nipple 46. Pin ring 50 provides a dual function. First, it secures the lock ring to the elbow assembly 32 and second, it provides the pins used by pin guides in the lock ring 48 to define the limits of travel between the open and closed position for disconnection and connection of the elbow assembly 32 to the receptacle assembly 34 in a manner to be described hereinafter in more detail.

Figures 5, 6:
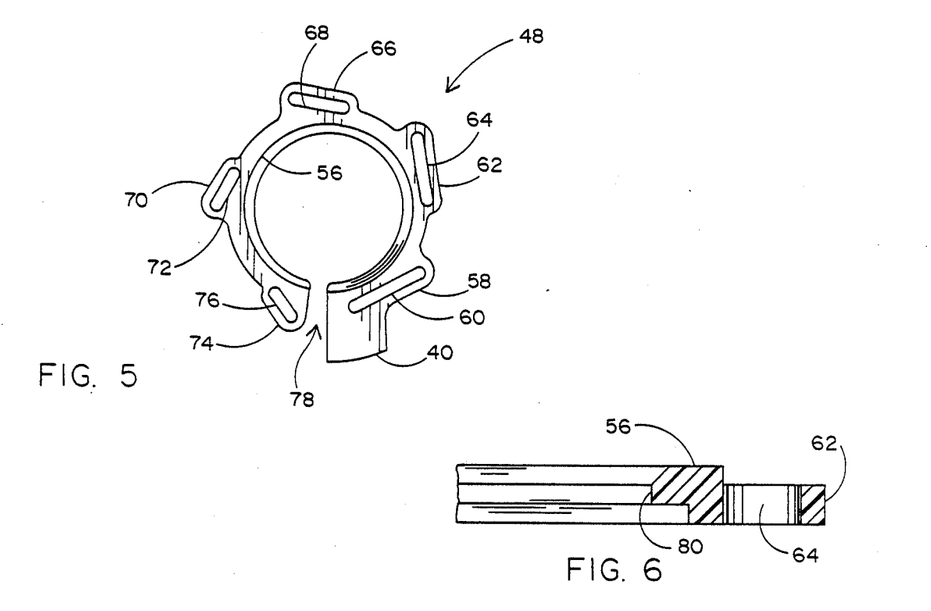
FIG. 5 is a top plan view of the lock ring of the present invention.
FIG. 6 is an enlarged cross-sectional view of a portion of the lock ring taken along lines 6—6 of FIG. 6.

Referring now to FIGS. 5 and 6 it will be seen that the lock ring 48 of the present invention comprises an annular-shaped member 56 interrupted by gap 78. The lock ring 48 is characterized by a plurality of pins guides 58, 62, 66, 70 and 74, each differing in size from the other and each having a corresponding slot 60, 64, 68, 72 and 76, respectively. The lock ring 48 is preferably made of a sturdy resilient material such as DELRIN so that gap 78 may be widened and narrowed depending upon whether the lock ring 48 is opened or closed. As seen best in FIG. 6, the annular portion of the lock ring is provided with a ridge 80 which extends around the entire inner perimeter of the lock ring and which is adapted to engage a lip of the nut ring 44 which will be discussed in more detail hereinafter in conjunction with FIGS. 9 and 10.

A tab 40 extends from the pin guide 58 to provide a convenient means for rotation the lock ring in a counter-clockwise direction as seen in FIG. 5. Such rotation, induced by the force applied to the tab 40, causes the respective pin guides and slots to also move in a somewhat counter-clockwise direction but each a different distance depending upon the length of the respective slot. As a result, pin guide 58 and slot 60 travel a greater distance than pin guide 62 and slot 64 which, in turn, travel a greater distance than pin guide 66 and slot 68 and so forth. As a result, gap 58 will be substantially increased in size thereby increasing the effective diameter of the annulus formed by ridge 80 of FIG. 6 thereby releasing ridge 80 from the nut ring 44 and specifically, from the lip 86 thereof discussed hereinafter in conjunction with FIG. 10.

Each of the slots and respective pin guides of lock ring 48 is adapted to receive a corresponding pin 95 of pin ring 50 which will be described hereinafter in conjunction with FIGS. 12 and 13. However, the action of the lock ring 48 between the open and closed position, that is, the position wherein gap 78 is either wide or narrow, respectively, may be observed by referring now to FIGS. 15 and 16 which illustrate the closed and open configuration of the lock ring 48, respectively. Thus, lock ring 48 is basically a "C"-shaped ring which acts as an external snap ring and effects attachment of the elbow assembly 32 to the jacket receptacle 34 by engaging an undercut lip on the receptacle. Tab 40 which is serrated extends from the lock ring through the outer wall of the elbow 32 (see FIG. 3) and serves as a lever by which the lock ring may be rotated about its axis by thumb action applied by the user. Rotation of the lock in this manner causes the ring to open radially in reaction to pins 95 through slots in the outer rim of the lock ring. The pins retain the lock ring within the elbow assembly and wedge the lock ring into the open position.

Figure 15:
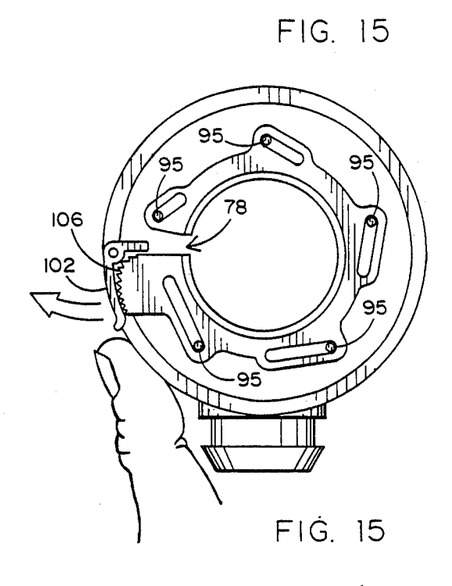
FIGS. 15 and 16 are bottom views of the lock ring portion of the present invention shown in its closed and open configurations, respectively, and illustrating the use of the protective tab of the embodiment of FIG. 14.
Figure 16:
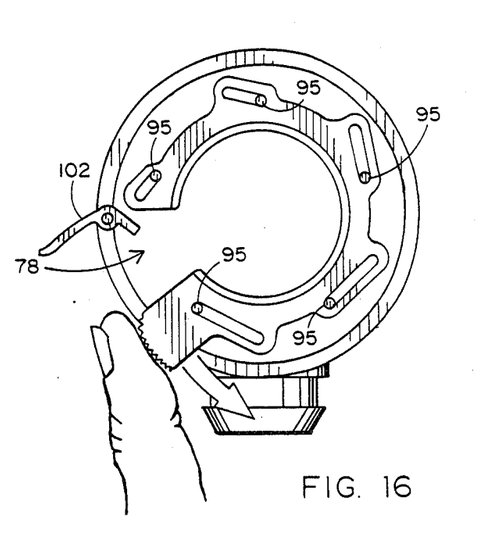

The slots in the lock ring through which the pins ride are parallel to tangents to the circle of the lock ring at each of their locations and are progressively longer to accommodate the expansion of the lock ring's effective radius and circumference. Upon rotation of the lock ring about its vertical axis, elements of the ring travel outwardly away from the center of rotation in relation to the angular deflection of the lock ring. The design of the lock ring also provides a self-springing action which, upon release of the tab 40 cause the lock ring to close to engage the lip of the nut ring thus effecting attachment of the elbow assembly 32 to the buoyancy jacket 22.

Figure 7:
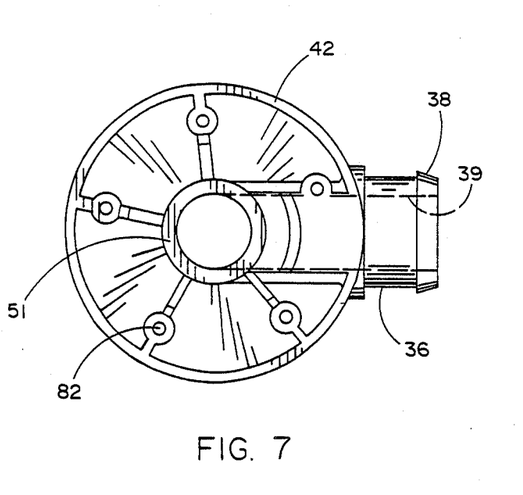
FIG. 7 is a bottom plan view of the elbow portion of the present invention.
Figure 8:
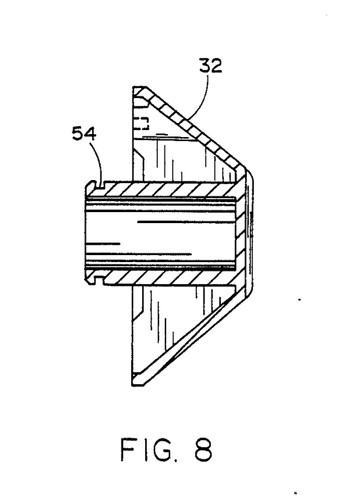
FIG. 8 is a side view cross-sectional view of the elbow portion of the invention taken along lines 8—8 of FIG. 7.

Referring now to FIGS. 7 and 8 it will be seen that the elbow assembly 32 of the present invention is provided with a plurality of radial ribs each of which provides a hole or recess 82 adapted to receive the top of the pins 95 extending through the slots in the lock ring 48. Thus it will be apparent that the pins 95 of the hereinafter discussed pin ring 50 shown in FIGS. 12 and 13, remain fixed relative to the elbow assembly 32 to provide a set of stable vertical pins around which the lock ring rotates between its open and closed positions.

Figure 9:
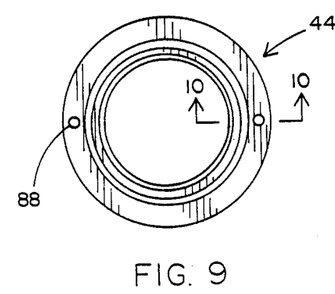
FIG. 9 is a top view of the nut ring portion of the present invention.
Figure 10:
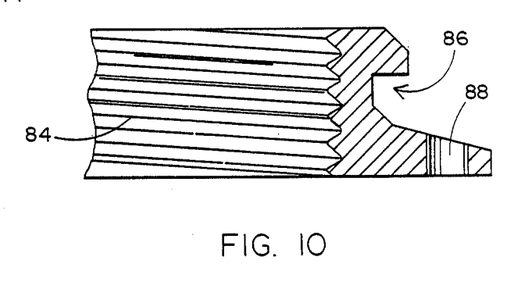
FIG. 10 is an enlarged cross-sectional view of a portion of the nut ring of the present invention taken lines 10—10 of FIG. 9.
Figure 11:
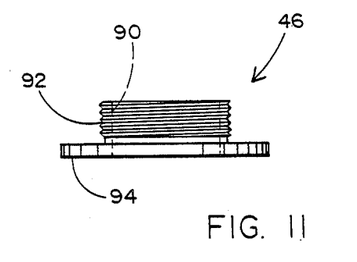
FIG. 11 is a side view of the nipple portion of the present invention.

Referring now to FIGS. 9 and 10 it will be seen that the nut ring 44 of the present invention is a relatively flat circular member characterized by a threaded interior surface 84 and an exterior lip 86, the latter acting to receive the ridge 80 of the lock ring 48 in the manner previously described. Furthermore, the nut ring 44 is provided with a pair of apertures 88 adapted to receive two machine screws which may be optionally added to provide additional security in securing the nut ring to the fabric of the buoyancy jacket 22 and the underlying nipple 46. Nipple 46 is shown in more detail in FIG. 11 wherein it may be seen that the nipple comprises a threaded extension 92 having a bore 90 and a flat portion 94 adapted to underlie the fabric of the buoyancy jacket 22 for sandwiching the buoyancy jacket fabric between the nipple 46 and the nut ring 44.

Figure 12:
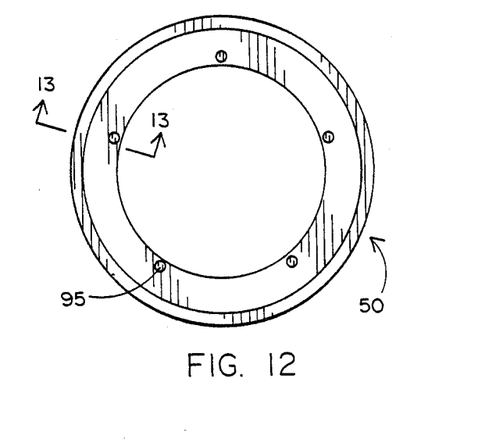
FIG. 12 is a top view of the pin ring of the present invention.
Figure 13:
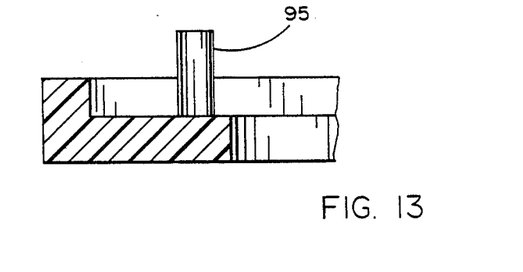
FIG. 13 is an enlarged cross-sectional view of a portion of the pin ring of the present invention taken along lines 13—13 of FIG. 12.

The pin ring 50 of the present invention may be best understood by referring to FIGS. 12 and 13. More specifically, as seen therein the pin ring 50 comprises an annular-shaped member having a plurality of pins 95 extending vertically therefrom at spaced angular intervals corresponding to the pin locations illustrated in FIGS. 15 and 16. As previously indicated, the elbow assembly 32 is provided with a plurality of receiving holes 82 into which the pins 95 extend sandwiching the lock ring 48 therebetween.

Figure 14:
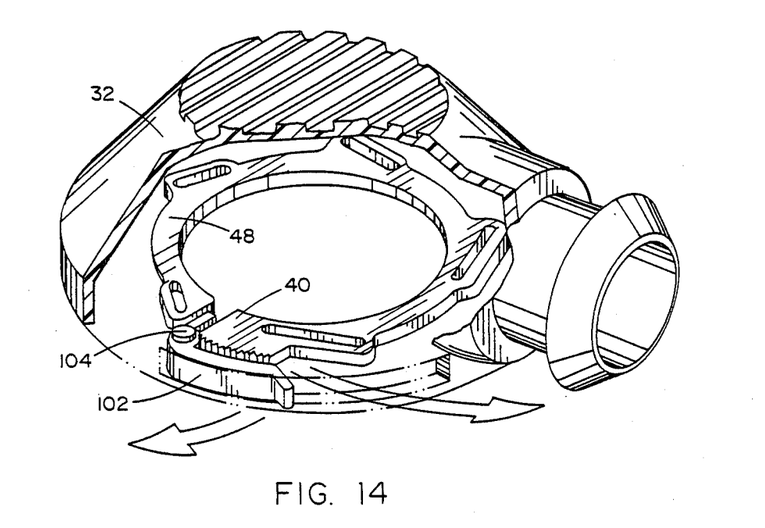
FIG. 14 is an enlarged three-dimensional, partially cutaway view of the elbow and lock ring of the present invention illustrating an additional embodiment thereof including a protective tab.

Referring now to FIG. 14 it will be seen that the present invention may be provided in an alternative embodiment in which the elbow assembly 32 is fitted with a tab cover 102 which is rotatably attached to a cover pin 104 permitting the tab cover to overlie a knurled surface 106 of the tab 40. In this manner, when the user wishes to remove the elbow from the vest, the protective tab cover 102 is first rotated away from the elbow. This action simultaneously actuates the lock ring through a small portion of its required travel to expose the actuation means or tab 40 to the user and allows the user to engage the tab 40 of the lock ring and continue the motion necessary to complete the unlocking of the lock ring. Thereafter, upon release of the tab by the user, the lock ring's self-springing action previously referred to herein, returns the lock ring to its original locked configuration. In doing so, the lock ring re-engages the protective tab cover 102 returning it automatically to the closed position seen in FIG. 14. The spring pressure exerted by the lock ring holds the tab cover 102 in its closed state until again actuated by the user. The geometrical configuration of the tab cover 102 permitting it to interact with the tab 40 and specifically knurled portion 106 thereof, is best seen in the top views provided in FIGS. 15 and 16. However, it will be understood that the tab cover 102 is an optional alternative embodiment which is not necessarily to be deemed limiting of the invention herein.

It will now be understood that what has been disclosed herein comprises a quick-disconnect elbow and receptacle for easy and expedient engagement and disengagement of an inflator hose from a buoyancy jacket used in scuba diving thereby giving the user the ability to quickly and easily remove and reconnect the inflator hose from the jacket. The elbow assembly comprises a plastic right angle elbow to couple the inflator hose to the buoyancy jacket. When the elbow is attached to the jacket, a dynamic seal and lock arrangement is obtained such that a continuous airway exists between the inflator hose and the interior of the jacket so that the elbow has the freedom to pivot 360 degrees around the axis of symmetry of the nut ring portion of the receptacle but cannot disconnect unless the user first expands a lock ring in a manually operated fashion. The lock ring of the present invention is a particularly novel feature thereof in that it is the element of the elbow assembly that actually fastens the assembly to the jacket receptacle to secure the inflator hose thereto. The lock ring is an annular C-shaped ring, preferrably made of a resilient material and which acts as an external snap ring and effects attachment of the elbow assembly to the jacket receptacle by engaging an undercut lip on the receptacle. The lock ring is sandwiched between the elbow assembly and a pin ring which provides a plurality of pins extending vertically through the lock ring. More specifically, the pins extend through pin guide slots which extend linearly along the periphery of the lock ring parallel to tangents of the lock ring circle and are progressively longer to accommodate the expansion of the lock ring's effective radius and circumference upon rotation of the lock ring about its vertical axis. The buoyancy jacket receptacle is a two-piece assembly consisting of a nipple which is an externally threaded tube with a flange at one end to contact the inner surface of the jacket wall leaving the threaded end protruding through the jacket wall toward the outside. The nipple also has an internal bore which provides an air passage into the jacket and is sized to provide a slight compression fit with the male protrusion of the elbow assembly and an O-ring. The nipple is secured to the jacket wall by means of a nut ring which has an internal thread to match the nipple thread and a flange to provide mechanical clamping when the two parts, that is, the nipple and the nut ring, are engaged and tightened to sandwich the jacket wall between the flanges of each. The nut ring has an undercut lip on its exterior which is designed to receive an annular ridge of the lock ring when the lock ring is in its closed configuration for securing the elbow assembly to the receptacle.

Those having skill in the art to which the present invention pertains will now, as a result of the teaching herein, perceive various modifications and additions which may be made to the invention. By way of example, other forms of locking configurations may be provided in the form of a rotatable coupling which gives easy access and expedient engagement and disengagement features to the user in order to connect or disconnect an inflator hose to a buoyancy jacket while obviating the arduous and inconvenient task of unscrewing the current type of elbow found in the prior art. Furthermore, it will be understood that the specific lock ring configuration of the present invention may be provided in other connecting and disconnecting applications wherein a rotatable quick release coupling and uncoupling feature is desired other than the specific application related to scuba diving equipment as described herein by way of example. Accordingly, all such modifications and additions are deemed to be within the scope of the invention which is to be limited only by the claims appended hereto.

I claim:

1. A quick-disconnect apparatus for selectively connecting and disconnecting an inflator hose and a scuba diver's buoyancy jacket; the apparatus comprising:
   an annular receptacle position on said buoyancy jacket and having a tubular extension providing an air flow channel into the interior of said jacket;
   a hose connecting member being connected at a first end to said inflator hose and having at a second end, means for grasping said receptacle in rotatable engagement therewith while providing a leakproof air flow path between said inflator hose and said channel; and
   means for releasing said grasping means without applying any forces in the direction of said tubular extension.

2. The apparatus recited in claim 1 wherein said receptacle comprises a nut ring having an annular ridge extending radially about the outer periphery of said receptacle and wherein said grasping means comprises a selectively expandable C-shaped member having a radially extending interior periphery for engaging said annular ridge.

3. The apparatus recited in claim 2 wherein said receptacle further comprises a nipple, at least a portion of which extends inside said buoyancy jacket, said nipple and said nut ring being compressively engageable relative to one another with said buoyancy jacket being secured therebetween for securing said receptacle to said buoyancy jacket.

4. The apparatus recited in claim 2 wherein said releasing means comprises means for selectively expanding said C-shaped member.

5. The apparatus recited in claim 4 wherein siad expanding means comprises a plurality of pin guide slots extending along the periphery of said C-shaped member, each of said slots being of a length that is different from each other of such slots and further comprising a plurality of pins, one such pin extending through each of said slots, respectively, in a direction substantially parallel to the axis of said C-shaped member, whereby rotation of said C-shaped member necessarily changes the interior radial dimensions of said C-shaped member.

6. The apparatus recited in claim 5 wherein each of said slots is straight and extends substantially parallel to a tangent of said C-shaped member.

7. The apparatus recited in claim 5 wherein said plurality of pins is provided on a pin ring positioned in spaced parallel relation to said C-shaped member, each of said pins extending from said pin ring through a corresponding slot in said C-shaped member and remaining relatively fixed in relation to one another along the length of said pin ring.

8. The apparatus recited in claim 5 wherein said expanding means further comprises a finger tab extending radially from said C-shaped member for facilitating rotation of said C-shaped member relative to said pins.

9. The apparatus recited in claim 8 further comprising a tab cover overlying said tab for preventing inadvertent rotation of said C-shaped member.

10. The apparatus recited in claim 9 wherein said tab cover is selectively rotatable for gaining access to said tab.

11. An improved quick-disconnect apparatus for selectively connecting and disconnecting first and second flow channels in respective first and second connecting members; the improvement comprising:
   a receptacle on said connecting first member, the receptacle having a nut ring providing an annular ridge extending radially about the outer periphery of said receptacle, the axis of said nut ring being coincident with said first channel; and
   a selectively expandable C-shaped member on said second connecting member and having a radially extending interior periphery for engaging said annular ridge of said receptacle, the axis of said C-shaped member being coincident with said second channel; and
   means for selectively expanding said C-shaped member for disconnecting said first and second connecting members without applying any forces in the direction of said flow channels.

12. The improvement recited in claim 11 wherein said expanding means comprises a plurality of pin guide slots extending along the periphery of said C-shaped member, each of said slots being of a length that is different from each other of such slots and further comprising a plurality of pins, one such pin extending through each of said slots, respectively, in a direction substantially parallel to the axis of said C-shaped member, whereby rotation of said C-shaped member necessarily changes the interior radial dimensions of said C-shaped member.

13. The improvement recited in claim 12 wherein each of said slots is straight and extends substantially parallel to a tangent of said C-shaped member.

14. The improvement recited in claim 12 wherein said plurality of pins is provided on a pin ring positioned in spaced parallel relation to said C-shaped member, each of said pins extending from said pin ring through a corresponding slot in said C-shaped member and remaining relatively fixed in relation to one another along the length of said pin ring.

15. The improvement recited in claim 12 wherein said expanding means further comprises a finger tab extending radially from said C-shaped member for facilitating rotation of said C-shaped member relative to said pins.

16. The improvement recited in claim 15 further comprising a tab cover overlying said tab for preventing inadvertent rotation of said C-shaped member.

17. The improvement recited in claim 16 wherein said tab cover is selectively rotatable for gaining access to said tab.

* * * * *